(12) United States Patent
Bu (10) Patent No.: US 8,311,164 B2
(45) Date of Patent: Nov. 13, 2012

(54) CORRELATOR FOR TRACKING SATELLITE SIGNAL

(75) Inventor: Sung Chun Bu, Seoul (KR)

(73) Assignee: Core Logic, Inc., Seoul (KR)

( * ) Notice: Subject to any disclaimer, the term of this patent is extended or adjusted under 35 U.S.C. 154(b) by 920 days.

(21) Appl. No.: 12/399,362

(22) Filed: Mar. 6, 2009

(65) Prior Publication Data

US 2009/0225909 A1 Sep. 10, 2009

(30) Foreign Application Priority Data

Mar. 7, 2008 (KR) .................. 10-2008-0021605

(51) Int. Cl.
*H03D 1/00* (2006.01)

(52) U.S. Cl. ........ 375/343; 375/137; 375/134; 375/145; 375/150

(58) Field of Classification Search ................. 375/343, 375/137, 134, 145, 150
See application file for complete search history.

(56) References Cited

U.S. PATENT DOCUMENTS 5,495,499 A * 2/1996 Fenton et al. ................. 370/479
6,603,803 B1 * 8/2003 Hatch ............................ 375/150

* cited by examiner

*Primary Examiner* — Kabir A Timory
(74) *Attorney, Agent, or Firm* — Nath, Goldberg & Meyer; Jerald L. Meyer; Stanley N. Protigal

(57) ABSTRACT

A correlation apparatus for tracking a satellite signal includes a shifter, a multiplexer and an accumulator. The shifter generates generating a Prompt signal, a plurality of Early signals and a plurality of Late signals. The multiplexer outputs at least one of the plurality of Early signals and at least one of the plurality of Late signals. The accumulator acquires a correlation signal to tracking the satellite signal.

15 Claims, 5 Drawing Sheets

CORRELATOR FOR TRACKING SATELLITE SIGNAL

CROSS-REFERENCE TO RELATED APPLICATIONS

This application claims the benefit of priority of Korean Patent Application No. 10-2008-021605 filed on Mar. 7, 2008, which is incorporated by reference in its entirety herein.

BACKGROUND OF THE INVENTION

The present invention relates to signal tracking and, more particularly, to an apparatus and method for tracking satellite signals.

A Global Navigation Satellite System (GNSS) tracks a position of a target on the ground using the network of artificial satellites flying in space. The GNSS refers to a Global Positioning System (GPS) operated by United States Department of Defense, a Galileo Positioning System being developed by European Union, and a GLObal NAvigation Satellite System (GLONASS) operated by Russia. The GNSS is extensively employed to acquire the location of aircrafts, vehicles, ships, etc. and also adapted for information technologies such as telematics and the like.

Typically, the GPS is a satellite navigation system for providing position information using satellites which revolve around the orbit of space. The GPS was initially constructed for military purposes and has been widely used in various fields after Selective Availability (SA) was removed since the year 2000. GPSs adopt a Code Division Multiple Access (CDMA) method and share a band using different codes based on the same frequency band.

The CDMA-based GPS uses a direct sequence spread spectrum by which the frequency band of a signal can be spread much wider than that of an original signal. A GPS receiver needs to accurately synchronize a received GPS signal and a pseudo noise (PN) code in order to reproduce desired information from the received GPS signal.

The GPS receiver includes a correlator for down-converting a signal received through an GPS antenna to a baseband signal and dispreading the signal. The signal received through the GPS antenna are generally converted into an intermediate frequency (IF) signal and are then quantized on a 2-bit basis. The correlator is configured to down-convert the IF signal to the baseband signal and to track the IF signal using CDMA codes such as Coarse/Acquisition (C/A) codes.

The correlator generally generates three signals having a ½ chip interval therebetween in order to track a satellite signal. The correlator generates a Prompt signal, an ½ Early signal which is a ½ chip earlier than the Prompt signal, and a ½ Late signal which is a ½ chip later than the Prompt signal. Conventionally, the GPS receiver filters the satellite signal every 2 MHz and rarely has a gain although the chip interval is reduced to less than ½ chip in the baseband processing process.

Recently, an RF module having a bandwidth of 4 MHz or more has been designed. If the correlator generates only signals having a ½ chip interval in the bandwidth of 4 MHz or more, it may be difficult to overcome error resulting from multi-paths. Accordingly, the correlator having a ¼ chip interval has emerged. In more detail, a Prompt signal, a ¼ Early signal which is a ¼ chip earlier than the Prompt signal, a ½ Early signal which is a ½ chip earlier than the Prompt signal, a ¼ Late signal which is a ¼ chip later than the Prompt signal, and a ½ Late signal which is a ½ chip later than the Prompt signal are used.

Figure 1:
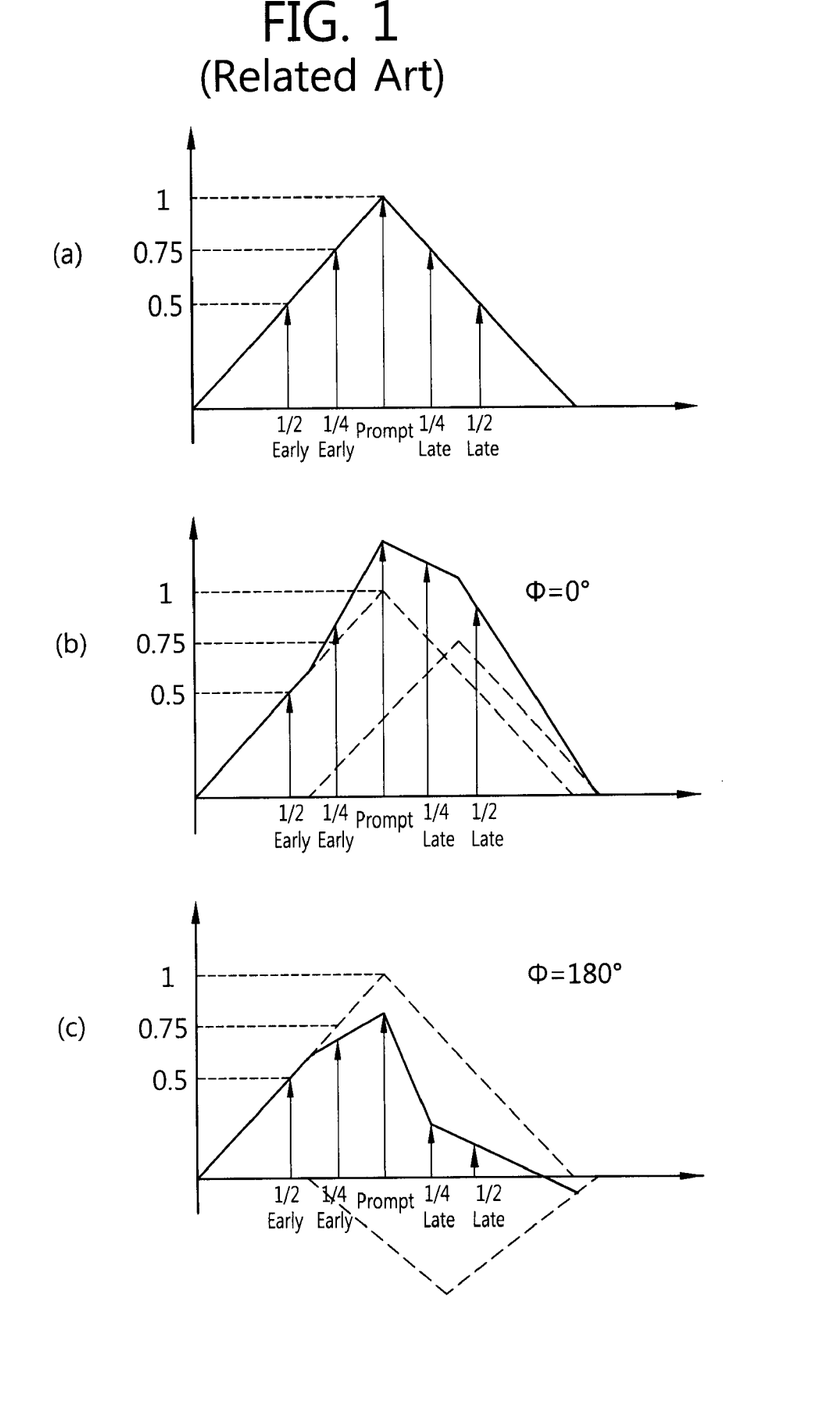
FIG. 1 shows graphs showing the relationships between correlation values resulting from a direct path and correlation values resulting from multi-paths.

FIG. 1 shows graphs showing the relationships between correlation values resulting from a direct path and correlation values resulting from multi-paths. A graph (a) of FIG. 1 shows correlation values using ideal ½ chip delay resulting from a direct path. The correlation value of a ¼ chip Late (or Early) signal is ¾ times the correlation value of a Prompt signal. Further, the correlation value of a ½ chip Late (or Early) signal is ½ times the correlation value of the Prompt signal. Tracking makes correlation values of the ¼ chip Late (or Early) signal and ½ chip Late (or Early) signal to maintain same ratio. An error due to the multi-paths is determined by using the correlation values of the ¼ chip Late (or Early) signal and ½ chip Late (or Early) signal and then is compensated. A graph (b) of FIG. 1 shows correlation values when multi-path signals having the same phase exist. A graph (c) of FIG. 1 shows correlation values when multi-path signals having a phase shift of 180° exist. From graphs (a), (b) and (c), it can be shown that the correlation values under multi-path are non-symmetric although correlation values under direct path are symmetric. Nevertheless, the correlation values of the ½ chip Late (or Early) signal of multi-path as shown in graph (b) is symmetric. This means that wrong tracking may be performed when only the ½ chip Late (or Early) signal is used. Accordingly, by using the correlation values of the ½ chip Late (or Early) signal as well as the correlation values of the ¼ chip Late (or Early) signal, more accurate tracking can be performed.

The complexity of the correlator may increase as the chip interval becomes narrow. For example, in order to support the ¼ chip interval, nine integration circuits may be necessary as compared with the case where the ½ chip interval uses five integration circuits. Accordingly, problems may arise because the design of the correlator becomes complicated and the capacity of memory required is increased.

SUMMARY

Techniques, a method and apparatus are described for tracking a satellite signal while coping with an error due to multi-path.

For example, the techniques, systems and apparatus can be implemented to provide a GPS receiver capable of coping with an error due to multi-path.

In an aspect, a correlation apparatus for tracking a satellite signal is provided. The correlation apparatus includes a code generator for generating a Pseudo Noise (PN) code, a shifter for generating a Prompt signal corresponding to the PN code, a plurality of Early signals having a chip interval earlier than that of the Prompt signal, and a plurality of Late signals having a chip interval later than that of the Prompt signal, a multiplexer for outputting at least one of the plurality of Early signals and at least one of the plurality of Late signals, a code mixer for mixing the satellite signal with the Early signal and the Late signal output from the multiplexer, and an accumulator for acquiring a correlation signal by integrating the signals output from the code mixer.

The shifter may output every other one of the plurality of Early signals and output every other one of the plurality of Late signals.

The plurality of Early signals may comprise a ½ Early signal and ¼ Early signals. The plurality of Late signals may comprise a ½ Late signal and ¼ Late signal. The plurality of Early signals may have the same chip interval as the plurality of Late signals.

The correlation apparatus may further include a mode controller for selecting the Early signal and the Late signal output from the multiplexer. The plurality of Early signals may comprise a ½ Early signal and ¼ Early signals and the plurality of Late signals may comprise a ½ Late signal and ¼ Late signal. The mode controller may control the multiplexer so that the multiplexer outputs only ½ Early/Late signals. The mode controller may control the multiplexer so that the multiplexer outputs only ¼ Early/Late signals. The mode controller may control the multiplexer so that the multiplexer alternately outputs ½ Early/Late signals and ¼ Early/Late signals.

The correlation apparatus may further include a clock generator for generating a reference frequency for generating the PN code, and a multiple frequency for generating the plurality of Early signals and the plurality of Late signals. The multiple frequency may be four times the reference frequency.

The multiplexer may output the at least one Early signal and the at least one Late signal in a specific cycle. The specific cycle may be an integration time of the accumulator.

In another aspect, a method of tracking a satellite signal is provided. The method includes acquiring the satellite signals, generating a Prompt signal corresponding to a PN code which is a satellite identification code, a plurality of Early signals, and a plurality of Late signals, selecting one of the plurality of Early signals, selecting one of the plurality of Late signals, and acquiring a correlation signal for the satellite signal based on the Prompt signal, the selected Early signal, and the selected Late signal.

The plurality of Early signals may be sequentially selected one by one, and the plurality of Late signals may be sequentially selected one by one.

Acquiring the correlation signals may includes removing carrier waves from the satellite signals, mixing each of the Prompt signal, the selected Early signal, and the selected Late signal with each of the signals from the carrier waves have been removed, and acquiring the correlation signals by integrating the mixed signals.

In still another aspect, a Global Positioning System (GPS) receiver includes a Radio Frequency (RF) unit for generating satellite signals based on signals received from GPS satellite, a correlator for generating satellite-based measurement results for tracking the satellite signals, and a satellite processor for determining position solutions based on the satellite-based measurement results. The correlator comprises a code generator for generating a PN code, a shifter for generating a Prompt signal corresponding to the PN code, a plurality of Early signals having a chip interval earlier than that of the Prompt signal, and a plurality of Late signals having a chip interval later than that of the Prompt signal, a multiplexer for outputting at least one of the plurality of Early signals and at least one of the plurality of Late signals, code mixers each for mixing each of the satellite signals with the Early signal and the Late signal output from the multiplexer, and accumulators each for acquiring correlation signals, becoming a basis of the satellite-based measurement results, by integrating the signals output from the code mixers.

DESCRIPTION OF EXEMPLARY EMBODIMENTS

Techniques, apparatus and systems are described for tracking a satellite signal that may satisfy the reduced complexity of a correlator and the mitigation of multi-path error. The techniques, systems and apparatus for tracking a satellite signal may be applied for a global navigation satellite system (GNSS) that determines a location by using the satellite signal received from an artificial satellite or a system that provides a multimedia service by using the satellite signal. The GNSS may use any satellite of a global positioning system (GPS), Galileo positioning system, a global navigation satellite system, and the like. In this disclosure, a GPS satellite refers to a satellite providing a satellite signal to the ground without being limited to a satellite applied for any particular system.

Figure 2:
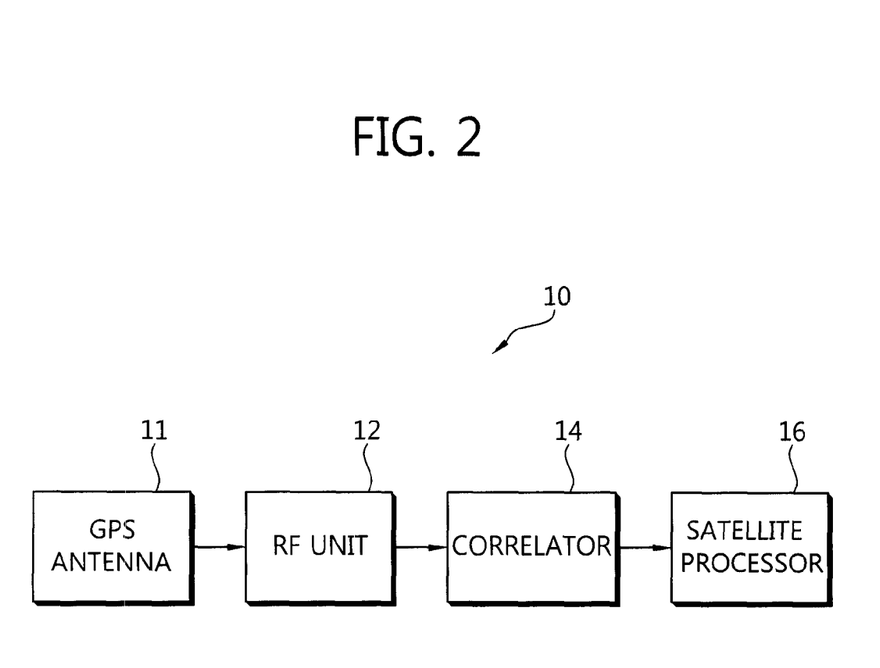
FIG. 2 is a block diagram showing a GPS receiver according to an embodiment of the present invention.

FIG. 2 is a block diagram showing a GPS receiver according to an embodiment of the present invention.

Referring to FIG. 2, a GPS receiver 10 includes a GPS antenna 11, a radio frequency (RF) unit 12, a correlator 14, and a satellite processor 16.

A composite of signals from various GPS satellites is received through the GPS antenna 11 and applied to the RF unit 12. The RF unit 12 down-converts the received signals into an intermediate frequency (IF) signal and outputs the IF samples of 2 bits, that is, a satellite signal.

The correlator 14 receives the satellite signal and generates satellite-based measurement results for tracking the GPS satellite. The satellite-based measurement results may be acquired from a correlation signal obtained by the correlator 14. The correlator 14 may generate satellite-based measurement results by varying signal channels according to different satellite signal channels in the cycle of a Pseudo-Noise (PN) code. A well-known code, such as a C/A code, may be used as the PN code, but not limited thereto. The satellite-based measurement results include information about position values for finding the signal strength of each of the satellite signals, acquired by tracking the satellite signals or the position solution of each of the satellite signals or both.

The satellite processor 16 determines position solutions based on the satellite-based measurement results received from the correlator 14. The determined position solutions may be used for navigation data, etc.

The correlator 14, that is, a correlation apparatus for tracking the satellite signal will be described below in detail.

Figure 3:
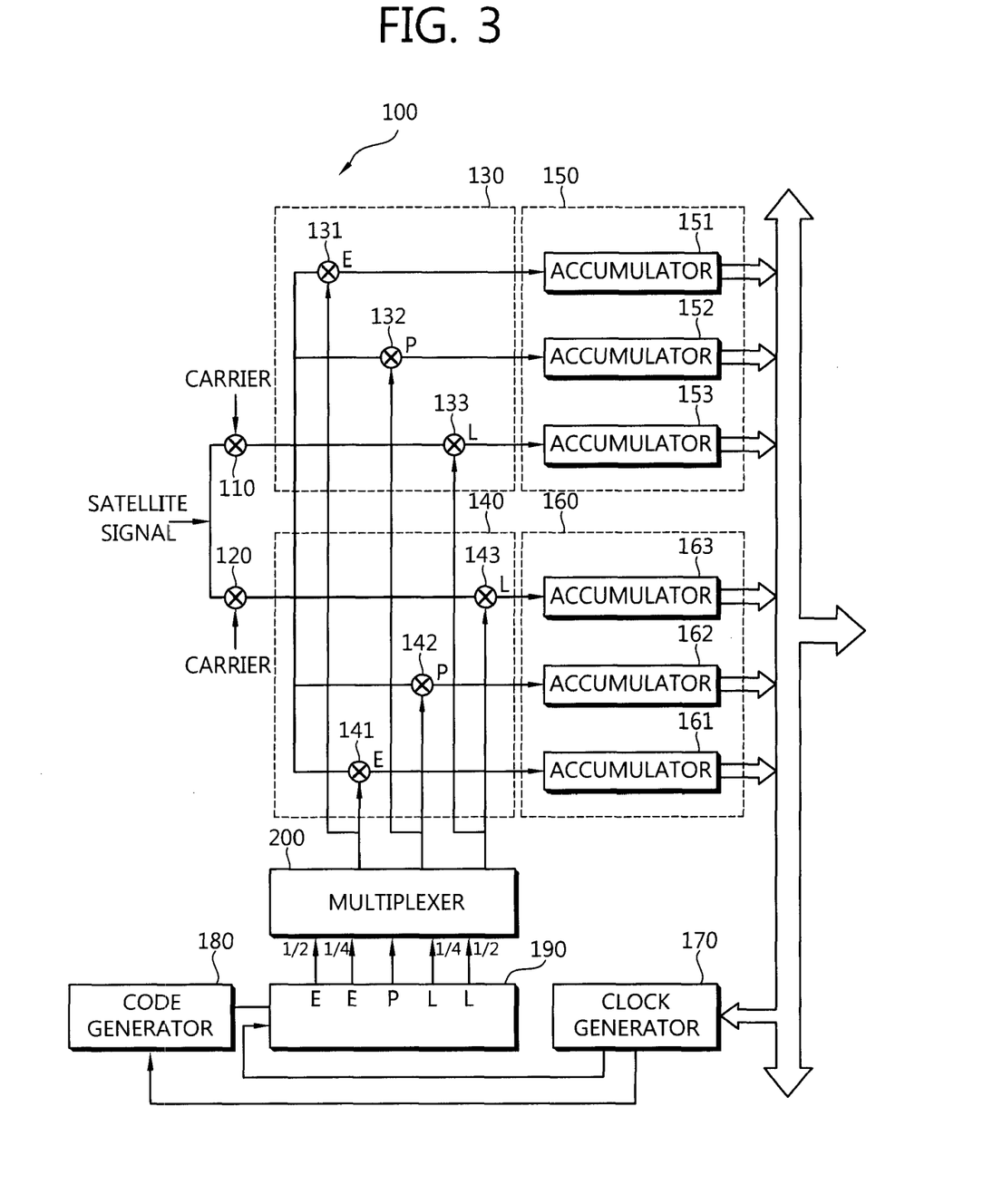
FIG. 3 is a diagram showing a correlation apparatus according to an embodiment of the present invention.

FIG. 3 is a diagram showing a correlation apparatus according to an embodiment of the present invention.

Referring to FIG. 3, a correlation apparatus 100 includes carrier mixers 110 and 120, code mixers 130 and 140, accumulators 150 and 160, a clock generator 170, a code generator 180, a shifter 190, and a multiplexer 200.

A satellite signal can be divided into a Inphase (I)-signal and a Quadrature phase (Q)-signal and then processed. The I-signal is sequentially processed by the I-carrier mixer 110, the I-code mixer 130, and the I-accumulators 150. The Q-signal is sequentially processed by the Q-carrier mixer 120, the Q-code mixer 140, and the Q-accumulator 160.

Each of the carrier mixers 110 and 120 outputs a carrier-removed signal in which a carrier waves has been removed from the satellite signal. The I-carrier mixer 110 removes the carrier wave from the I-signal, and the Q-carrier mixer 120 removes the carrier wave from the Q-signal.

Each of the code mixers 130 and 140 mixes each of the carrier-removed signals with Prompt, Early, and Late signals provided by the multiplexer 200. The I-code mixer 130 includes a first mixer 131 for mixing the Early signals with the respective signals output from the I-carrier mixer 110, a second mixer 132 for mixing the Prompt signals with the respective signals output from the I-carrier mixer 110, and a third mixer 133 for mixing the Late signals with the respective signals output from the I-carrier mixer 110 and outputting the mixed signals. The Q-code mixer 140 includes a first mixer 141 for mixing the Early signals with the respective signals output from the Q-carrier mixer 120, a second mixer 142 for mixing the Prompt signals with the respective signals output from the Q-carrier mixer 120, and a third mixer 143 for mixing the Late signals with the respective signals output from the Q-carrier mixer 120.

The accumulators 150 and 160 accumulate the respective signals output from the code mixers 130 and 140 for an integration time and output respective correlation signals. The I-accumulator 150 integrates the signals output from the I-code mixer 130. A first accumulator 151 integrates the signals output from the first code mixer 131 and outputs correlation values for the respective Early signals which are a ½ or ¼ chip earlier than the Prompt signal. A second accumulator 152 integrates the signals output from the second code mixer 132 and outputs correlation values for the respective Prompt signals. A third accumulator 153 integrates the signals output from the third code mixer 133 and outputs correlation values for the respective Late signals which are a ½ or ¼ chip slower than the Prompt signals. The Q-accumulator 160 integrates the signals from the Q-code mixer 140. A first accumulator 161 integrates the signals output from the first code mixer 141 and outputs correlation values for the respective Early signals which are a ½ or ¼ chip earlier than the Prompt signals. A second accumulator 162 integrates the signals output from the second code mixer 142 and outputs correlation values for the respective Prompt signals. A third accumulator 163 integrates the signals output from the third code mixer 143 and outputs correlation values for the respective Late signals which are a ½ or ¼ chip later than the Prompt signals.

The clock generator 170 generates a reference frequency, which is the same as the frequency of a PN code, and a quadruple frequency corresponding to four times the reference frequency. The quadruple frequency is a frequency which is four times the reference frequency. Although the quadruple frequency is used as a multiple frequency in order to generate the Early and Late signal each having a ¼ chip interval therebetween, the multiple frequency may become an integer times of the reference frequency depending on the chip interval. The reference frequency is input to the code generator 180, and the quadruple frequency is input to the shifter 190.

The code generator 180 generates the PN code based on the reference frequency and outputs the generated PN code to the shifter 190. The PN code is a satellite identification code for identifying satellites.

The shifter 190 generates the plurality of Early signals and the plurality of Late signals based on the PN code, received from the code generator 180, by using the quadruple frequency. The shifter 190 generates the Prompt signal, the ¼ Early signal which is a ¼ chip earlier than the Prompt signal, the ½ Early signals which is a ½ chip earlier than the Prompt signal, the ¼ Late signal which is a ¼ chip later than the Prompt signal, and the ½ Late signal which is a ½ chip later than the Prompt signal. A shift register may be used as the shifter 190.

The multiplexer 200 may select at least one of the plurality of Early signals output from the shifter 190 and sequentially outputs the selected Early signal. Further, the multiplexer 200 may select at least one of the plurality of Late signals output from the shifter 190 and sequentially outputs the selected Late signal. The multiplexer 200 outputs every other one of the ½ Early signal and the ¼ Early signal to the code mixers 130 and 140 one by one. Further, the multiplexer 200 outputs every other one of the ½ Late signal and the ¼ Late signal to the code mixers 130 and 140 one by one. The multiplexer 200 may multiplex the signals based on the integral cycle of each of the accumulators 150 and 160.

For example, it is assumed that the integral cycle is 1 milli-second (ms). During the first 1 ms, the multiplexer 200 may output a Prompt signal, a ½ Early signal, and a ½ Late signal to the code mixers 130 and 140. During the next 1 ms, the multiplexer 200 may output a Prompt signal, a ¼ Early signal, and a ¼ Late signal to the code mixers 130 and 140. Accordingly, during 32 ms, correlation values for sixteen ½ Early/Late signals, correlation values for sixteenth ¼ Early/Late signals, and correlation values for thirty-two Prompt signals may be obtained.

The correlation values for the ½ Early/Late signals and the correlation values for the ¼ Early/Late signals may be obtained without using additional code mixers and accumulators. Accordingly, the complexity of the correlation apparatus can be reduced and a reduced chip interval can be implemented. Consequently, multi-path error occurring when satellite signals are tracked can be reduced.

Further, since ¼ Late/Early signals and ½ Late/Early signals are selectively used, the size of a circuit can be reduced and the cost can be reduced. Moreover, since ¼ Late/Early signals as well as ½ Late/Early signals are used, multi-path error can be reduced.

Figure 4:
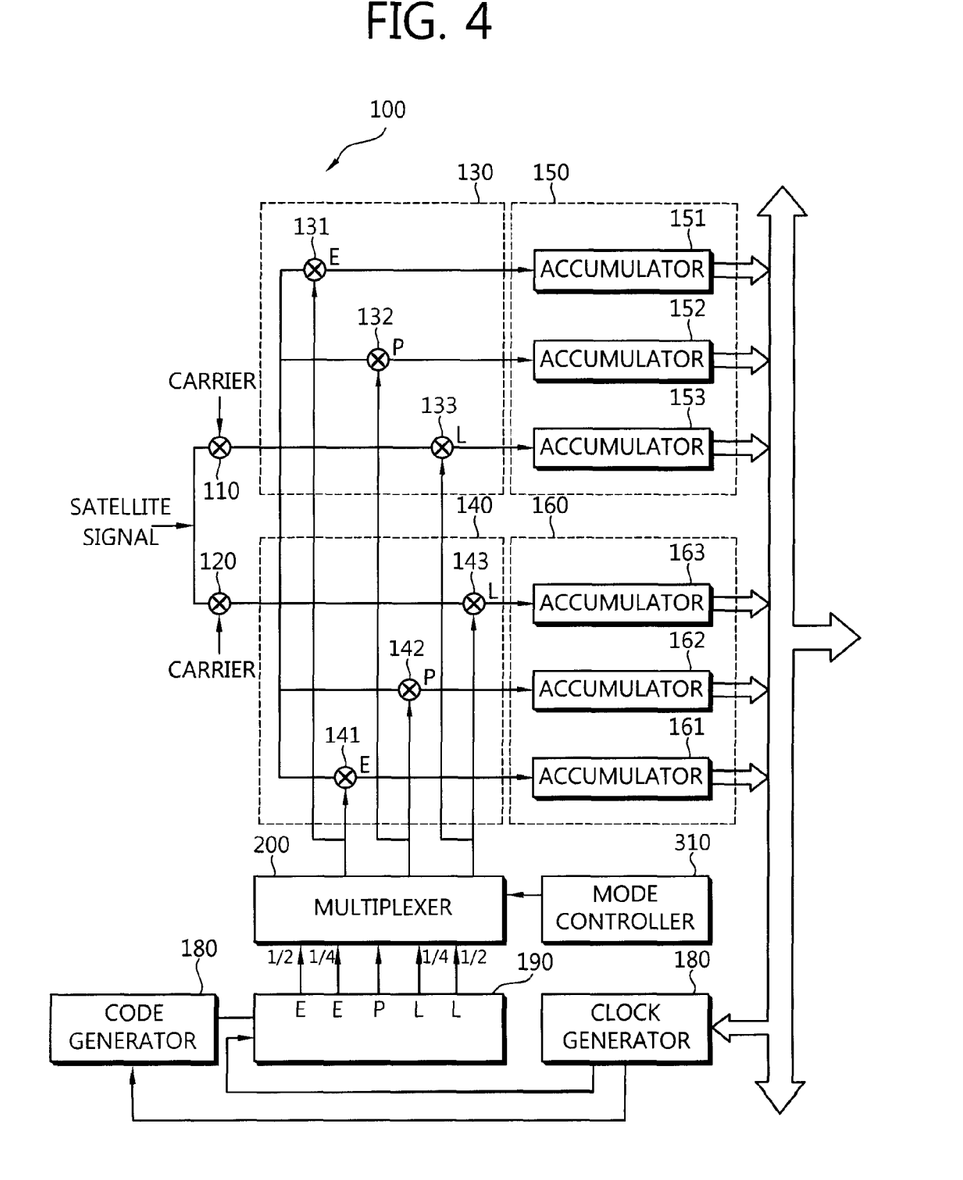
FIG. 4 is a diagram showing a correlation apparatus according to another embodiment of the present invention.

FIG. 4 is a diagram showing a correlation apparatus according to another embodiment of the present invention. The embodiment of FIG. 4 further includes a mode controller 310 in the embodiment of FIG. 3. The mode controller 310 controls the multiplexer 200 so that the multiplexer 200 outputs signals with a specific chip interval intervened therebetween. For example, the mode controller 310 may control the multiplexer 200 so that the multiplexer 200 outputs only ½ Early/Late signals. The mode controller 310 may control the multiplexer 200 so that the multiplexer 200 outputs only ¼ Early/Late signals. Alternatively, the mode controller 310 may control the multiplexer 200 so that the multiplexer 200 alternately outputs ½ Early/Late signals and ¼ Early/Late signals.

The mode controller 310 may adjusts the chip interval for the output signals periodically or non-periodically. For example, the mode controller 310 may sequentially output ½ Early/Late signals or ¼ Early/Late signals by the period of an integral time.

The correlation apparatus may support a variety of chip intervals. The correlation apparatus may be applied to a variety of GPS receivers by controlling the types of Early/Late signals or an output cycle.

Figure 5:
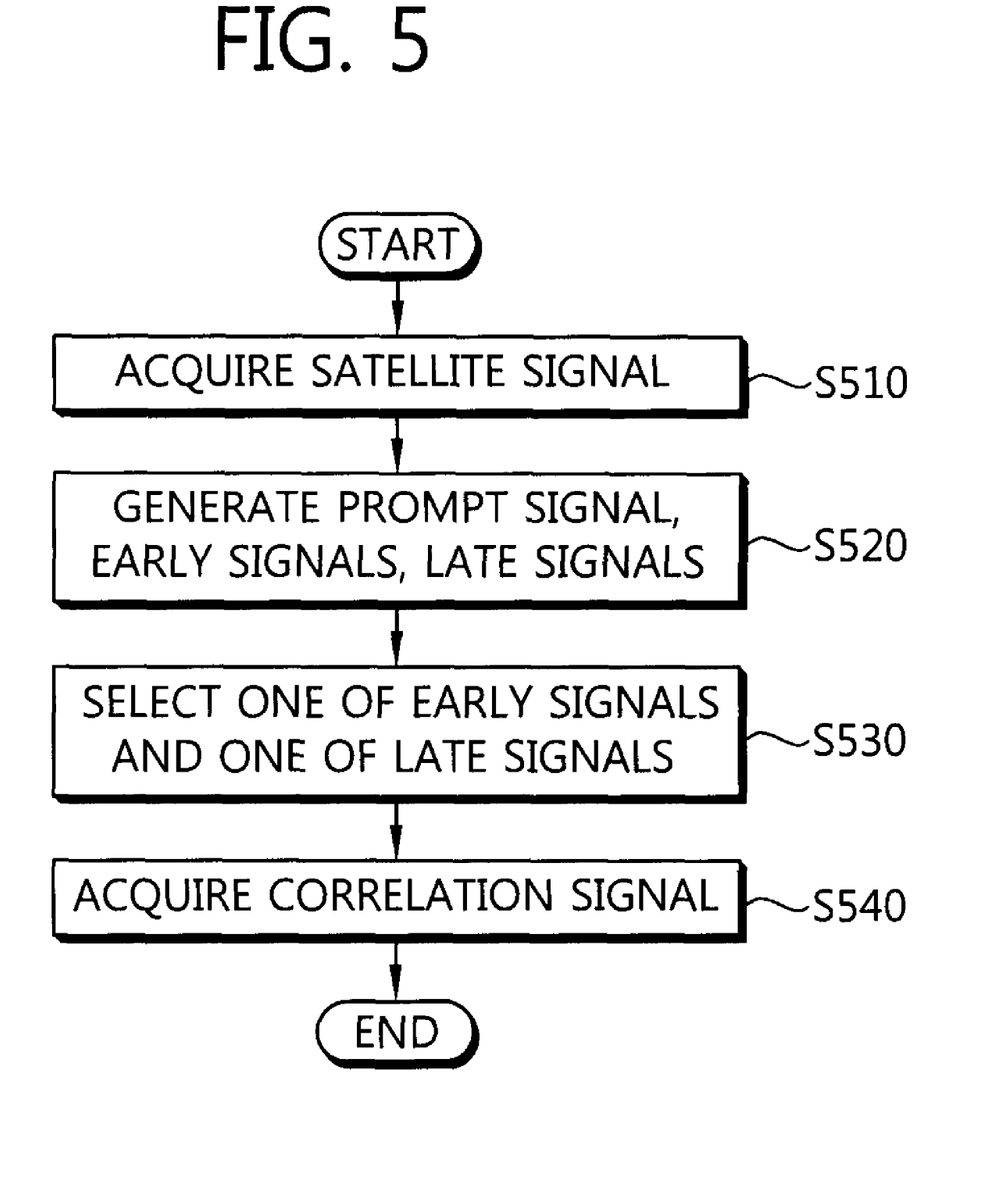
FIG. 5 is a flowchart showing a method of tracking satellite signals according to an embodiment of the present invention.

FIG. 5 is a flowchart showing a method of tracking a satellite signal according to an embodiment of the present invention.

Referring to FIG. 5, a satellite signal is acquired at step S510. The satellite signal may be obtained by down-converting a signal received from a GPS satellite into an IF signal.

At step S520, a Prompt signal corresponding to a PN code, a plurality of Early signals, and a plurality of Late signals are generated. The PN code may be a satellite identification code for identifying the GPS satellites. The chip interval of the plurality of Early signals may be the same as that of the plurality of Late signals. The plurality of Early signals may include a ½ Early signal and a ¼ Early signal. The plurality of Late signals may include a ½ Late signal and a ¼ Late signal.

At step S530, one of the plurality of Early signals is selected and one of the plurality of Late signals is selected. The plurality of Early signals may be sequentially selected one by one, and the plurality of Late signals may be sequentially selected one by one. The Early/Late signals may be selected in a specific cycle. For example, during the first cycle, a Prompt signal, a ½ Early signal, and a ½ Late signal may be output. During the next cycle, a Prompt signal, a ¼ Early signal, and a ¼ Late signal may be output.

At step S540, a correlation signal is acquired from the satellite signal based on the Prompt signal, the selected Early signal, and the selected Late signal. The correlation signal comprises correlation values, that is, the basis of satellite-based measurement results for finding a position solution. In order to acquire the correlation signal, a carrier wave is first removed from the satellite signal. The Prompt signal, the selected Early signal, and the selected Late signal are mixed with the signal from which the carrier wave has been removed. The correlation signal is acquired by integrating the mixed signal.

As described above, the complexity of a correlator resulting from a reduction in a chip interval can be reduced. Further, error resulting from multi-paths can be reduced and a reduction in the performance of a GPS receiver can also be reduced.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Only a few implementations and examples are described and other implementations, enhancements and variations can be made based on what is described and illustrated in this application.

What is claimed is:

1. A correlation apparatus for tracking a satellite signal, comprising:
a code generator for generating a Pseudo Noise (PN) code;

a shifter for generating a Prompt signal corresponding to the PN code, a plurality of Early signals having a chip interval earlier than that of the Prompt signal, and a plurality of Late signals having a chip interval later than that of the Prompt signal; a multiplexer for outputting at least one of the plurality of Early signals and at least one of the plurality of Late signals;

a code mixer for mixing the satellite signal with the Early signal and the Late signal output from the multiplexer;

an accumulator for acquiring a correlation signal by integrating the signals output from the code mixer; and a mode controller controlling the multiplexer so that the multiplexer outputs by selecting one of a chip interval of ½ Early/Late signals and ¼ Early/Late signals provided by the mode controller, a clock generator for generating a reference frequency for generating the PN code, and a multiple frequency for generating the plurality of Early signals and the plurality of Late signals;

wherein the shifter outputs every other one of the plurality of Early signals and outputs every other one of the plurality of Late signals, and wherein the plurality of Early signals comprises the ½ Early signal and ¼ Early signals and the plurality of Late signals comprises the ½ Late signal and ¼ Late signal.

2. The correlation apparatus as claimed in claim 1, wherein the plurality of Early signals has the same chip interval as the plurality of Late signals.

3. The correlation apparatus as claimed in claim 1, wherein the mode controller controls the multiplexer so that the multiplexer outputs only ½ Early/Late signals.

4. The correlation apparatus as claimed in claim 1, wherein the mode controller controls the multiplexer so that the multiplexer outputs only ¼ Early/Late signals.

5. The correlation apparatus as claimed in claim 1, the mode controller controls the multiplexer so that the multiplexer alternately outputs ½ Early/Late signals and ¼ Early/Late signals.

6. The correlation apparatus as claimed in claim 1 wherein the multiple frequency is four times the reference frequency.

7. The correlation apparatus as claimed in claim 1, wherein the multiplexer outputs the at least one Early signal and the at least one Late signal in a specific cycle.

8. The correlation apparatus as claimed in claim 7, wherein the specific cycle is an integration time of the accumulator.

9. A method of tracking a satellite signal, comprising:
acquiring the satellite signals;
generating a Prompt signal corresponding to a PN code which is a satellite identification code, a plurality of Early signals, and a plurality of Late signals;
selecting one of the plurality of Early signals;
selecting one of the plurality of Late signals;
acquiring a correlation signal for the satellite signal based on the Prompt signal, the selected Early signal, and the selected Late signal; and
a mode controller controlling the multiplexer so that the multiplexer outputs by selecting one of a chip interval of ½ Early/Late signals and ¼ Early/Late signals provided by the mode controller,
a clock generator for generating a reference frequency for generating the PN code, and a multiple frequency for generating the plurality of Early signals and the plurality of Late signals;
wherein the shifter outputs every other one of the plurality of Early signals and outputs every other one of the plurality of Late signals,
and wherein the plurality of Early signals comprises the ½ Early signal and ¼ Early signals and the plurality of Late signals comprises the ½ Late signal and ¼ Late signal.

10. The method as claimed in claim 9, wherein the plurality of Early signals is sequentially selected one by one, and the plurality of Late signals is sequentially selected one by one.

11. The method as claimed in claim 9, wherein the selected Early signal has the same chip interval as the selected Late signal.

12. The method as claimed in claim 9, wherein the plurality of Early signals and the plurality of Late signals are generated by sequentially shifting the Prompt signal.

13. The method as claimed in claim 9, wherein one of the plurality of Early signals is selected periodically and one of the plurality of Late signals is selected periodically.

14. The method as claimed in claim 9, wherein acquiring the correlation signals comprises:
removing carrier waves from the satellite signals;
mixing each of the Prompt signal, the selected Early signal, and the selected Late signal with each of the signals from the carrier waves have been removed; and
acquiring the correlation signals by integrating the mixed signals.

15. A Global Positioning System (GPS) receiver, comprising:
a Radio Frequency (RF) unit for generating satellite signals based on signals received from GPS satellite;
a correlator for generating satellite-based measurement results for tracking the satellite signals; and
a satellite processor for determining position solutions based on the satellite-based measurement results,
wherein the correlator comprises:
a code generator for generating a PN code;
a shifter for generating a Prompt signal corresponding to the PN code, a plurality of Early signals having a chip interval earlier than that of the Prompt signal, and a plurality of Late signals having a chip interval later than that of the Prompt signal;
a multiplexer for outputting at least one of the plurality of Early signals and at least one of the plurality of Late signals;
code mixers each for mixing each of the satellite signals with the Early signal and the Late signal output from the multiplexer;
accumulators each for acquiring correlation signals, becoming a basis of the satellite-based measurement results, by integrating the signals output from the code mixers; and
a mode controller controlling the multiplexer so that the multiplexer outputs by selecting one of a chip interval of ½ Early/Late signals and ¼ Early/Late signals provided by the mode controller,
a clock generator for generating a reference frequency for generating the PN code, and a multiple frequency for generating the plurality of Early signals and the plurality of Late signals;
wherein the shifter outputs every other one of the plurality of Early signals and outputs every other one of the plurality of Late signals,
and wherein the plurality of Early signals comprises the ½ Early signal and ¼ Early signals and the plurality of Late signals comprises the ½ Late signal and ¼ Late signal.

* * * * *